United States Patent [19]

Grimes et al.

[11] 3,964,800
[45] June 22, 1976

[54] WEAR STRIP
[75] Inventors: Donald D. Grimes, Waukesha;
Roger M. Hahn, Whitefish Bay;
Jerome F. Sheldon, Milwaukee, all of Wis.
[73] Assignee: Rexnord Inc., Milwaukee, Wis.
[22] Filed: Aug. 20, 1975
[21] Appl. No.: 606,253

[52] U.S. Cl. .................... 308/3 R; 198/195
[51] Int. Cl.² ............................ F16C 5/00
[58] Field of Search ............... 198/189, 195, 204; 226/196; 308/3 R

[56] References Cited
UNITED STATES PATENTS
3,265,192   8/1966   Stadelman ............ 198/195 X
3,825,108   7/1974   Stone .................. 198/195 X Primary Examiner—M. H. Wood, Jr.
Assistant Examiner—Gene A. Church
Attorney, Agent, or Firm—Sughrue, Rothwell, Mion, Zinn & Macpeak

[57] ABSTRACT

A wear strip for conveyor chains comprising a flat upper wear member having at least two spaced-apart holes therethrough for the reception of connection means, at least one linear support member joined to the underside of the wear member, and at least two base members joined to the underside of the wear member and having holes therethrough in registry with the holes through the wear member. The whole wear strip is preferably integrally injection molded, and each of the holes in the wear member are preferably countersunk on the upper surface. Two embodiments are disclosed, one in which one linear support member is joined to the wear member along each lateral edge thereof and one in which a single linear support member is joined to the wear member along one lateral edge thereof.

11 Claims, 6 Drawing Figures

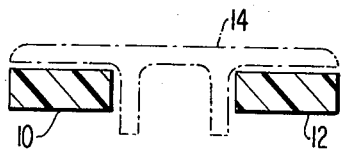
(PRIOR ART)
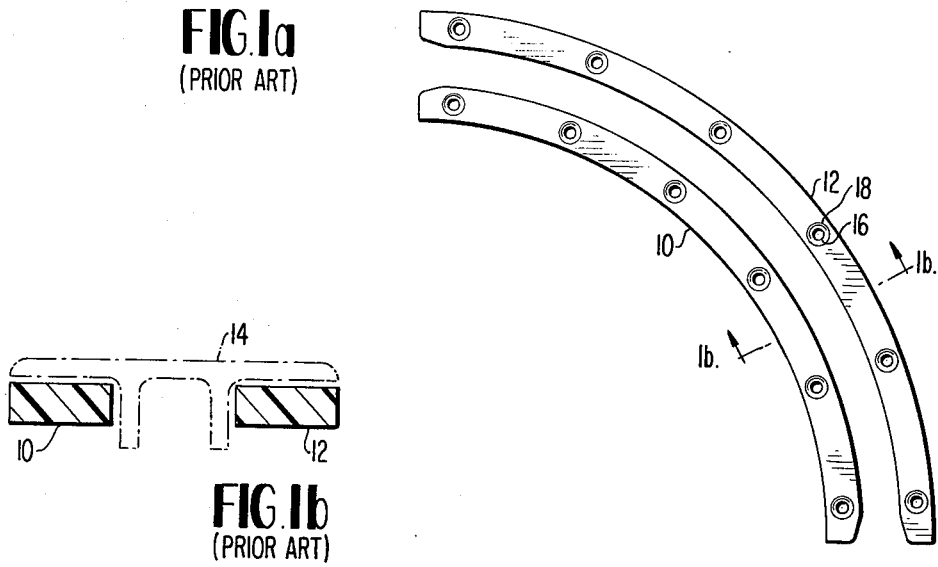
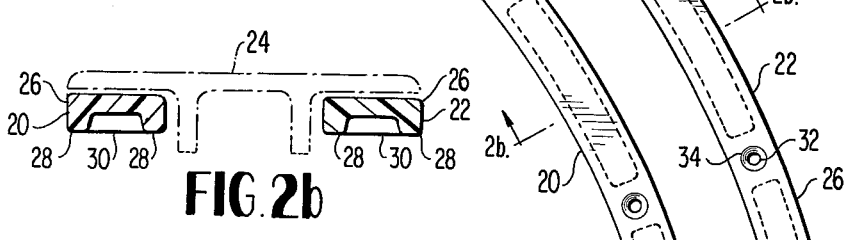
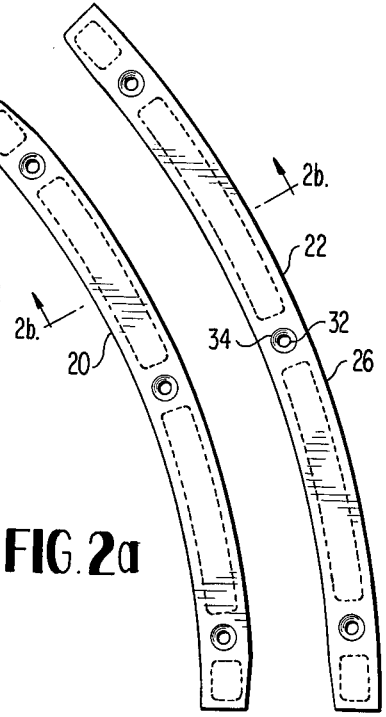
FIG. 2a
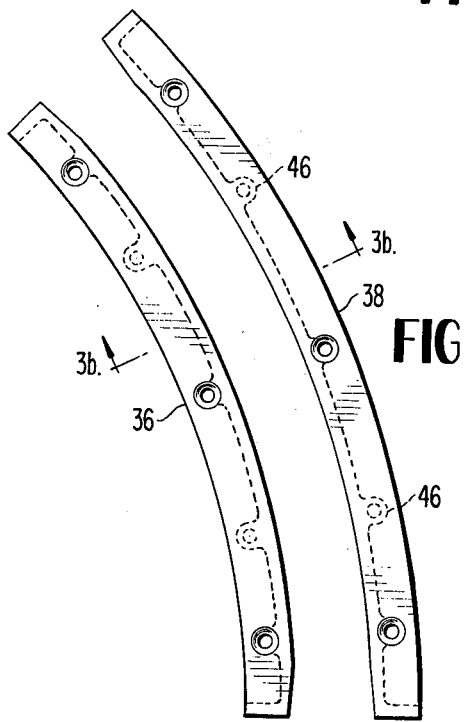
FIG. 3a
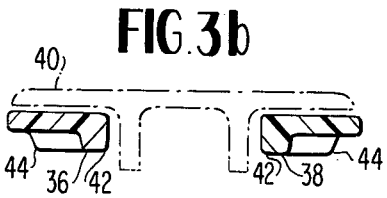
FIG. 3b

3,964,800

WEAR STRIP

BACKGROUND OF THE INVENTION

1. Field of the Invention

This invention relates to chains of the type pioneered by a predecessor of the assignee hereof and sold under the trademark Tabletop Chains. Such chains are adapted to run along and be guided by wear strips which are affixed to structure over which the conveyor chains run. The present invention is an improvement in such wear strips.

2. Description of the Prior Art

The prior art wear strips were, in essence, solid rectangular bars having holes formed therethrough for the reception of screws or bolts to affix the wear strips to the structure over which it was intended to run conveyor chains.

SUMMARY OF THE INVENTION

Wear strips according to the present invention comprise a flat upper wear member having at least two spaced-apart holes therethrough for the reception of connection means, at least one linear support member joined to the underside of the wear member, and at least two base members joined to the underside of the wear member and having holes therethrough in registry with the holes through the wear member. The whole wear strip is preferably integrally injection molded, and each of the holes in the wear member are preferably countersunk on the upper surface. Two embodiments are disclosed, one in which one linear support member is joined to the wear member along each lateral edge thereof and one in which a single linear support member is joined to the wear member along one lateral edge thereof.

BRIEF DESCRIPTION OF THE DRAWINGS

FIG. 1a is a plan view of two parallel wear strips according to the prior art.

FIG. 1b is a view along the lines 1b—1b in FIG. 1a with a conveyor chain shown in phantom line.

FIG. 2a is a plan view of two parallel wear strips according to one embodiment of the present invention.

FIG. 2b is a view along the lines 2b—2b in FIG. 2a with a conveyor chain shown in phantom line.

FIG. 3a is a plan view of two parallel wear strips according to a second embodiment of the present invention.

FIG. 3b is a view along the lines 3b—3b in FIG. 3a with a conveyor chain shown in phantom line.

DETAILED DESCRIPTION OF THE PRIOR ART

Two conventional prior art wear strips 10 and 12 are shown in FIGS. 1a and 1b. While the strips shown comprise a 90° curve, it is of course conventional to shape them in various ways including straight line segments. A link 14 of a conveyor chain is shown in phantom in FIG. 1b to illustrate the relationship between the conveyor chain and the wear strips over which they run.

As may be seen in FIGS. 1a and 1b, the wear strips according to the prior art were essentially rectangular, solid bars having holes 16 formed therethrough for the reception of screws or bolts (not shown). Countersinks 18 are provided to receive the heads of the screws or bolts to allow the conveyor chains to run over them without interference.

DETAILED DESCRIPTIONS OF THE PREFERRED EMBODIMENTS

Two wear strips 20 and 22 according to the present invention are shown in FIGS. 2a and 2b, a link 24 of a conveyor chain again being shown in phantom in the cross-sectional view. These wear strips comprise a flat upper wear member 26, two linear support members 28, and three base members 30, all of which are preferably integrally injection molded.

The upper surface of the wear member 26 is adapted to contact and guide conveyor chains, as shown in FIG. 2b. Running therethrough are at least two (in this case, three) holes 32 for the reception of connection means, such as screws or bolts (not shown), the holes 32 being spaced apart along the length of the wear member 26. Each of the holes 32 is countersunk at 34 on the upper surface of the wear member 26 in order to receive the heads of the screws or bolts to allow the conveyor chains to run over them without interference.

The support members 28 are joined to the wear members 26 along each lateral edge of the underside thereof and are adapted to contact the surface of a structure over which conveyor chains are to be run in order to provide support for the wear member 26. As shown, the total transverse dimension of the two support members 28 comprise a small fraction of the total transverse dimension of the wear members 26.

The base members 30 are joined to the wear members 26 on the undersides thereof at the location of the holes 32 in the wear members 26, and each base member 30 has a hole (unnumbered) therethrough for the reception of a connection means, the hole in the base members 30 being in registry with and in essence continuations of the corresponding holes in the wear members 26.

Two wear strips 36 and 38, constituting a second embodiment of the present invention, are shown in FIGS. 3a and 3b, a link 40 of a conveyor chain again being shown in phantom in the cross-sectional view. These wear strips are generally similar to those shown in FIGS. 2a and 2b, and accordingly only the differences will be described.

Each of the wear strips 36 and 38 has only a single linear support member 42 joined to the wear member 24 along the inner lateral edges thereof. Furthermore, the base members 44, instead of extending across the entire central portion of the wear members 26, extend out from the support member 42 only far enough to provide structural support for the holes therethrough. Finally, in this embodiment several additional base members 46 are provided which do not register with holes in the wear members 26. These function as extra fastening means, holes being readily provided in the wear members 26 at the time of installation if it is necessary to fasten the wear strips down more firmly than they would be by the pre-provided holes.

In addition to conserving raw materials, the absence of one of the linear support members 42 in the embodiment shown in FIGS. 3a and 3b permits better heat dissipation by opening the underside of the wear member 24 to air circulation. This can be a very important advantage of this embodiment, since the conveyor chains with which the wear strips are used typically operate at high speeds and, when they operate around a curve, they contact the wear strips at high pressures thereby generating a great deal of heat.

Preferably, the wear strips are made by an injection molding process in order to form them completely at one time, eliminating all need for secondary manufacturing operations, such as saw cutting to length, punching and countersinking the holes, and providing end relief. Manufacturing the wear strips in this manner also has the advantage of reducing the amount of material needed, since non-functional material is eliminated during the molding process.

Structural soundness may be insured by running the linear support members the full length of each strip and by the substantial solid base members molded into each strip at the hold-down countersunk holes. On the other hand, torsional softness is purposely introduced by relieving non-functional material so that the hold-down bolts or screws draw the strip solidly into contact with the conveyor frame.

CAVEAT

While the present invention has been illustrated by a detailed description of the preferred embodiments thereof, it will be obvious to those skilled in the art that various changes in form and detail can be made therein without departing from the true scope of the invention. For that reason, the invention must be measured by the claims appended hereto and not by the foregoing preferred embodiments.

What is claimed is:

1. A wear strip for conveyor chains, said wear strip comprising:
  a. a flat upper wear member, the upper surface of which is adapted to contact and guide conveyor chains, said flat upper wear member having at least two holes therethrough for the reception of connection means, said holes being spaced apart along the length of said flat upper wear member;
  b. at least one linear support member joined to said flat upper wear member along the underside thereof and adapted to contact the surface of a structure over which conveyor chains are to be run in order to provide support for said flat upper wear member; and
  c. at least two base members joined to said flat upper wear member on the underside thereof at the location of said at least two holes in said flat upper wear member, each of said base members having at least one hole therethrough for the reception of connection means, said at least one hole in each of said base members being in registry with the corresponding hole in said flat upper member.

2. A wear strip as claimed in claim 1, having two linear support members, one joined to said flat upper wear member along each lateral edge thereof.

3. A wear strip as claimed in claim 2 wherein said flat upper wear member, said linear support members, and said at least two base members are all integrally injection molded.

4. A wear strip as claimed in claim 3 wherein each of said holes in said flat upper wear member is countersunk on the upper surface of said flat upper wear member.

5. A wear strip as claimed in claim 2 wherein each of said holes in said flat upper wear member is countersunk on the upper surface of said flat upper wear member.

6. A wear strip as claimed in claim 1 wherein each of said holes in said flat upper wear member is countersunk on the upper surface of said flat upper wear member.

7. A wear strip as claimed in claim 1 wherein said flat upper wear member, said at least one linear support member, and said at least two base members are all integrally injection molded.

8. A wear strip as claimed in claim 1 having a single linear support member joined to said flat upper wear member along a lateral edge thereof.

9. A wear strip as claimed in claim 8 wherein said flat upper wear member, said linear support member, and said at least two base members are all integrally injection molded.

10. A wear strip as claimed in claim 9 wherein each of said holes in said flat upper wear member is countersunk on the upper surface of said flat upper wear member.

11. A wear strip as claimed in claim 8 wherein each of said holes in said flat upper wear member is countersunk on the upper surface of said flat upper wear member.

* * * * *